US009030555B2

(12) United States Patent
Kim et al.

(10) Patent No.: US 9,030,555 B2
(45) Date of Patent: May 12, 2015

(54) SURVEILLANCE SYSTEM

(75) Inventors: Sung Jin Kim, Seoul (KR); Hyoung Hwa Yoon, Seoul (KR); Jae Shin Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 661 days.

(21) Appl. No.: 12/625,614

(22) Filed: Nov. 25, 2009

(65) Prior Publication Data

US 2011/0122247 A1 May 26, 2011

(51) Int. Cl.
*H04N 7/18* (2006.01)
*G06K 9/00* (2006.01)
*G08B 13/196* (2006.01)

(52) U.S. Cl.
CPC ...... *G08B 13/1968* (2013.01); *G08B 13/19652* (2013.01); *G08B 13/19682* (2013.01)

(58) Field of Classification Search
CPC ..................... G08B 13/19652; G08B 13/1968; G08B 13/19682
USPC ................. 348/149, 180, 184, 185, 333, 143, 348/E7.085; 382/187
See application file for complete search history.

(56) References Cited

U.S. PATENT DOCUMENTS 5,467,402 A 11/1995 Okuyama
5,828,848 A * 10/1998 MacCormack et al. ...... 709/247
5,854,902 A * 12/1998 Wilson et al. ................ 709/247
6,335,722 B1 * 1/2002 Tani et al. ...................... 345/173
6,628,887 B1 * 9/2003 Rhodes et al. ............... 386/230
6,696,945 B1 2/2004 Venetianer
6,985,172 B1 * 1/2006 Rigney et al. ................. 348/149
2006/0227997 A1 * 10/2006 Au et al. ....................... 382/103
2009/0231433 A1 * 9/2009 Grigsby et al. ............... 348/149
2010/0321473 A1 * 12/2010 An ................................ 348/47

* cited by examiner

*Primary Examiner* — Christopher S Kelley
*Assistant Examiner* — Asmamaw G Tarko
(74) *Attorney, Agent, or Firm* — Fish & Richardson P.C.

(57) ABSTRACT

A method of operating a surveillance system having a display unit configured to display a surveillance image includes acquiring the surveillance image from at least one acquisition device. The method also includes setting surveillance event that includes setting a desired surveillance object indicating an attribute of the surveillance event. Further, the method includes displaying the selected surveillance object with the acquired surveillance image on the display unit to indicate the set surveillance event and analyzing the acquired surveillance image to determine whether the set surveillance event has occurred. In addition, the method includes performing an indicating operation in the surveillance system in response to the occurrence of the set surveillance event.

20 Claims, 14 Drawing Sheets

SURVEILLANCE SYSTEM

FIELD

The present disclosure relates to surveillance technology, which is capable of setting a surveillance event.

BACKGROUND

For security and other purposes, a variety of surveillance methods and surveillance devices are being used. One of the surveillance devices is a visual surveillance system capable of achieving the purpose of surveillance by monitoring and analyzing surveillance images acquired and transmitted by surveillance cameras.

The visual surveillance system has the surveillance cameras installed at surveillance regions to be monitored and provides a user with images acquired by the surveillance cameras, enabling the user to easily determine what conditions are occurring in the regions.

SUMMARY

In one aspect, a method of operating a surveillance system having a display unit configured to display a surveillance image, includes acquiring the surveillance image received from at least one acquisition device. The method also includes setting surveillance event that includes setting a desired surveillance object indicating an attribute of the surveillance event and input information including at least one of text, a symbol and number. Further, the method includes displaying the selected surveillance object with the acquired surveillance image on the display unit to indicate the set surveillance event and analyzing the acquired surveillance image to determine whether the set surveillance event has occurred. In addition, the method includes responsive to a determination that the set surveillance event has occurred, performing an indicating operation in the surveillance system.

Implementations may include one or more of the following features. For example, the surveillance object may be a symbol stored in a storage unit. The surveillance object may be at least one text character. The method may include storing the surveillance image determination that the set surveillance event has occurred.

In some implementations, performing the indicating operation may include displaying an indication image or text in response to the occurrence of the set surveillance event on the displaying unit. Performing the indicating operation may include generating an alarm or producing a voice stored in a storage unit in response to the occurrence of the set surveillance event. Performing the indicating operation may include sending a text message to a registered telephone number in response to the occurrence of the set surveillance event.

In another aspect, a method of operating a surveillance system having a display unit configured to display at least one surveillance image received from image acquisition devices includes displaying the surveillance image on the display unit. The method also includes receiving text and accessing surveillance objects stored in a storage unit. Further, the method includes detecting correspondence between the received text and a subset of less than all of the accessed surveillance objects. In addition, the method includes displaying the subset of less than all of the surveillance objects together with the surveillance image on the display unit.

Implementations may include one or more of the following features. For example, receiving text from a user may include inputting a text by a user, detecting related texts similar to the inputted text from among a plurality of texts stored in a storage unit, displaying the related texts on the display unit, and selecting one of the related texts.

In some examples, detecting the surveillance object may include searching an image object corresponding to the received text from among a plurality of image objects stored in the storage unit and displaying the surveillance object corresponding to the image object. Detecting the image object may include searching a pre-stored image pattern stored in the storage unit corresponding to the received text and detecting the image object corresponding to the image pattern from among the surveillance images based on the retrieved image pattern.

A shape of the surveillance object may include one of a line and a closed curve comprising a polygon. A predetermined surveillance event may be matched with the surveillance object.

The surveillance object may reflect an attribute of the surveillance event. One of a position, a size, and a shape of the surveillance object may be set or changed by a user. Displaying the surveillance object may include providing one or more surveillance objects corresponding to the received text, selecting the surveillance object from among surveillance objects, and displaying the selected surveillance object.

The method further may include setting a surveillance event that includes setting a position or region where the surveillance object has been displayed and monitoring whether the surveillance event has occurred.

In yet another aspect, a surveillance system includes image acquisition devices configured to obtain surveillance images. The system also includes an input unit configured to input information including at least one of text, a symbol and number. Further, the system includes a storage unit configured to store a plurality of surveillance objects and information, with each corresponding to at least one of the surveillance objects. In addition, the system includes a controller configured to perform operations of searching the plurality of the surveillance objects stored in the storage unit to detect a surveillance object corresponding to the information and displaying the surveillance object and the information, together with the surveillance images on the display unit.

Implementations may include one or more of the following features. For example, the input unit may be a touch screen or a touch pad. The controller may be configured to search a plurality of image objects to detect an image object corresponding to the inputted text from among the plurality of image objects, and to display the surveillance object corresponding to the image object. The surveillance object may be indicative of the attribute of the surveillance event.

In some implementations, at least one of a position, a size, and a shape of the displayed surveillance object may be set or changed by a user. The display unit may be classified into a surveillance image display region and an input region for inputting text when the text is inputted. Inputting text may include selecting one of the texts stored in the storage unit.

DETAILED DESCRIPTION

Figure 1:
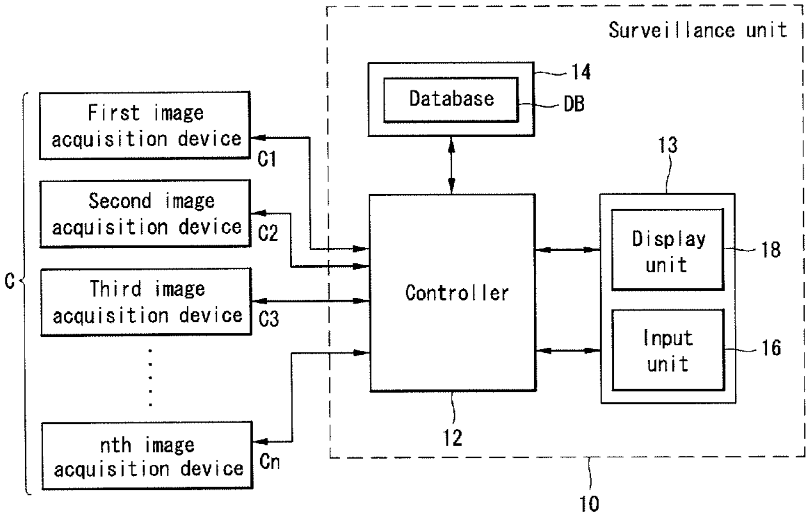
FIG. 1 is a block diagram schematically showing the construction of a surveillance system.

Referring to FIG. 1, a visual surveillance system includes a plurality of image acquisition devices C and a surveillance unit 10. The image acquisition devices C are installed at proper positions where images of regions that a user will monitor using the visual surveillance system (hereinafter referred to as 'surveillance regions') can be captured and are configured to capture the images of the surveillance regions. The image acquisition devices C can be coupled to the surveillance unit 10, and the images acquired by the image acquisition devices C can be sent to the surveillance unit 10. The images acquired by the image acquisition devices C are hereinafter referred to as 'surveillance images'.

The surveillance unit 10 may comprise a controller 12, memory 14, and a user interface 13. The user interface 13 may comprise, for example, an input unit 16 and a display unit 18. The controller 12 may control the operations of the image acquisition devices C, the memory 14, the input unit 16, and the display unit 18. The memory 14 may comprise a database DB in which surveillance objects and respective corresponding texts, numbers, symbols are matched.

The surveillance images can be outputted from the controller 12 and displayed through the display unit 18 of the user interface 13 such that the user can monitor the surveillance images. The display unit 18 may be a display device, such as a general monitor, and a plurality of the display units 18 may be used.

The display unit 18 may display only one of the plurality of surveillance images acquired by the plurality of image acquisition devices C. Here, the plurality of surveillance images can be sequentially displayed through the display unit 18 at a predetermined interval.

In another implementation, the display unit 18 may display the plurality of surveillance images acquired by all or some of the image acquisition devices C on its one screen. In the case where the plurality of surveillance images is displayed in one display unit 18, a screen of the display unit 18 can be classified into a plurality of subscreens. The plurality of surveillance images can be displayed on the respective subscreens. Alternatively, in the case where a plurality of the display units 18 are used, each of the plurality of display units 18 may be classified into a subscreen.

For example, in the case where the visual surveillance system is equipped with nine image acquisition devices C, a screen of the display unit 18 may be equally classified into nine subscreens arranged in three rows and three columns. Surveillance images acquired by the nine image acquisition devices C can be respectively displayed on the nine subscreens.

The surveillance images can be stored in the memory 14 of the surveillance unit 10, such as hard disk. The visual surveillance system can search surveillance images stored in the memory 14 by a user request.

The input unit 16 can receive a various types of input signals, such as number, text, symbol and etc, from the user. The input unit 16 may include but not limited to a touch screen, a touch pad, or a key input device such as the keyboard or the mouse. The user can input a text for displaying a surveillance object through the input unit 16.

The database DB can match the surveillance objects with respective corresponding texts and store them. For example, "Line" (i.e., a surveillance object) can correspond to a text called "Do Not Enter", and "Quadrangle" (i.e., a surveillance object) can correspond to a text called "No Parking". Further, in the database DB, predetermined surveillance events can match the respective surveillance objects.

The surveillance objects and the surveillance events are described in detail in connection with a method of operating a visual surveillance system.

The surveillance event refers to an accident or event that may happen within a surveillance region. The surveillance event may be set such that a user can effectively achieve the purpose of surveillance.

For example, the user can set a specific virtual region in a surveillance image and then set the motion of a person within the specific region as a surveillance event. Alternatively, the user can set a virtual line in a specific region of a surveillance image and then set the passage of a vehicle through the line as a surveillance event. In other words, the user can set a proper surveillance event in the visual surveillance system in order to achieve the purpose of surveillance. In the present implementation, the surveillance event can be arbitrarily set by a user, or the surveillance event can be matched with the surveillance object and then stored in the database DB.

The term 'surveillance object' refers to a virtual object displayed on the display unit 18 in order to display a region or position where a surveillance event will be set.

For example, in order to set the surveillance event, a user can set a virtual surveillance object, such as the virtual line or region, in the surveillance images displayed in the display unit 18. The surveillance objects can comprise, for example, a line and an arrow such as "a, b, and c" shown in FIG. 4B, a polygon such as "d, e, and f" shown in FIG. 5B, a indication image such as S1 shown in FIG. 6A, a polygon with a symbol such as S2 shown in FIG. 6B, OB shown in FIG. 7B, OB2 shown in FIG. 8A, OB3 and OB4 shown in FIG. 9B, and OB5 shown in FIG. 10C.

Figure 2:
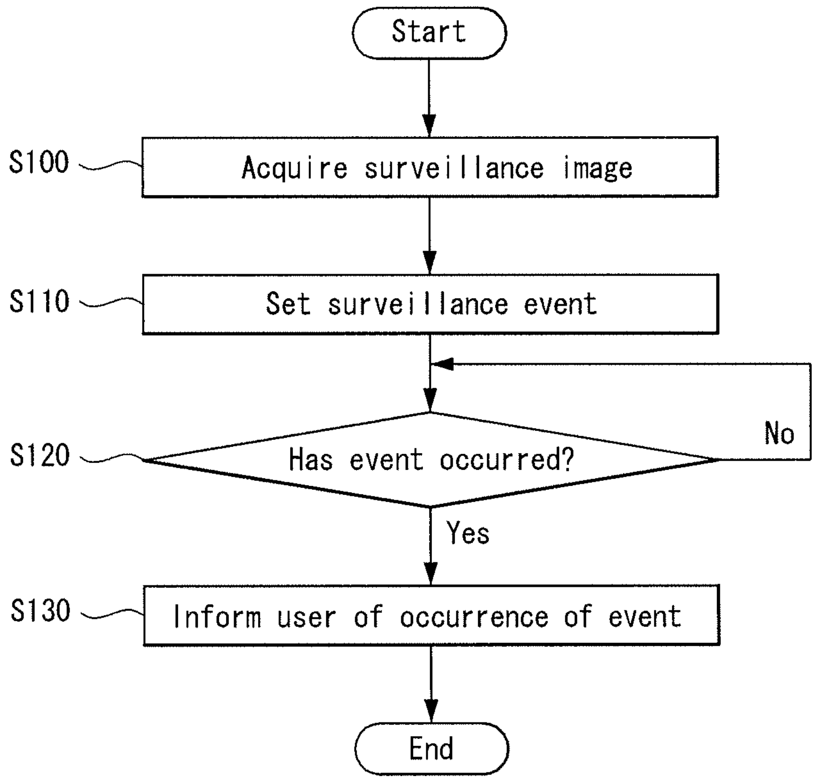
FIG. 2 is a flowchart illustrating a method of operating a surveillance system.

Referring to FIG. 2, the visual surveillance system acquires a surveillance image (S100). A surveillance event can be set in the visual surveillance system (S110). The visual surveillance system can determine whether the set surveillance event is occurring by analyzing the acquired surveillance image (S120). If, as a result of the determination, the set surveillance event is determined to be occurring, the visual surveillance system can perform an operation that has been previously set in response to the occurrence of the set surveillance event (S130). For example, if the set surveillance event is determined to have occurred, the visual surveillance system can inform a user that the surveillance event has occurred (S130).

When the visual surveillance system detects that the surveillance event has occurred, the visual surveillance system can give an alarm. In another implementation, the visual surveillance system can inform the user that the surveillance event has occurred by sending a text message to a previously registered telephone number, dialing the telephone number and outputting a previously recorded voice, or converting a previously stored text into voice and outputting the voice. To convert the text into voice can be performed using text-to-speech (TTS) technology. In yet another implementation, the visual surveillance system can easily inform a user in which region has a surveillance event occurred by flickering a surveillance object corresponding to the region where the surveillance event has occurred.

As described above, the visual surveillance system can set a surveillance event and, when the set surveillance event occurs, inform a user that the surveillance event has occurred. Accordingly, although a surveillance region is wide, the user can easily exercise surveillance over the wide region. Further, the visual surveillance system does not store all surveillance images in the memory 14, but stores only a surveillance image corresponding to the occurrence of a set surveillance event in the memory 14. Accordingly, an excessive increase in the capacity of the memory 14 can be prevented. Even in the case where a surveillance event is set, the visual surveillance system can store all surveillance images (e.g., all surveillance images corresponding to cases where a surveillance event has not occurred).

In order to set the surveillance event, the visual surveillance system can display a surveillance object.

A method of displaying the surveillance object together with the surveillance image and setting a surveillance event in the surveillance object is described below.

Figure 3:
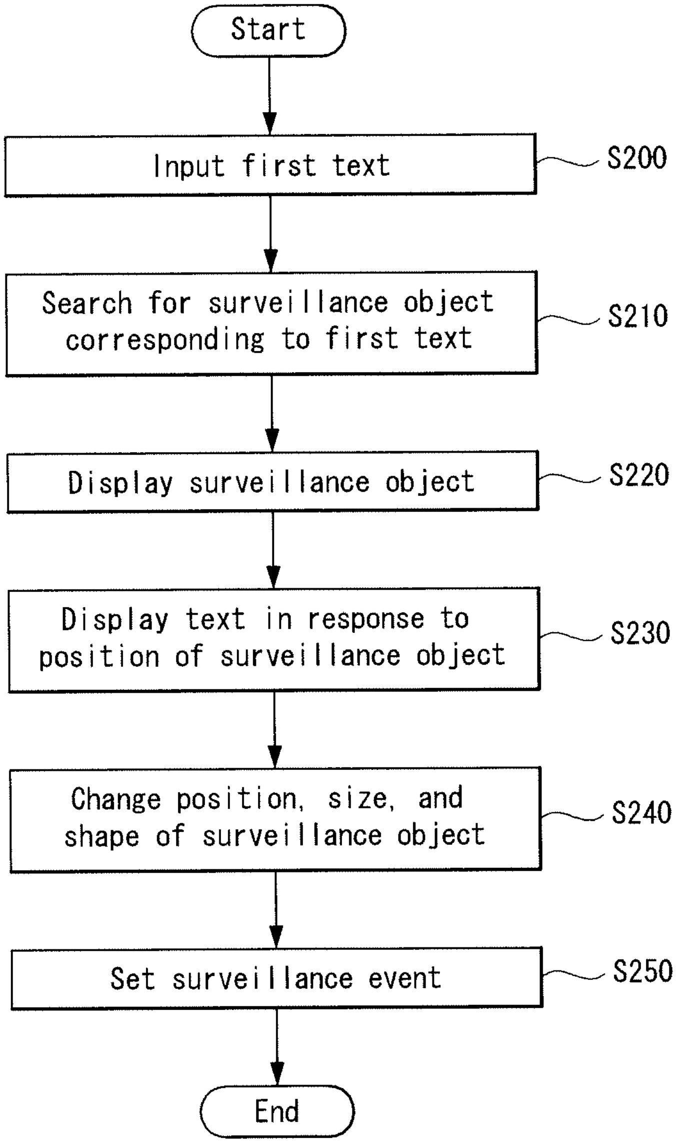
FIG. 3 is a flowchart illustrating a method of displaying a surveillance object and setting a surveillance event.

Referring to FIG. 3, the visual surveillance system can receive a text from a user (S200). The text may correspond to a predetermined surveillance object or may be indicating the surveillance object or a use of a surveillance event that will be set for the surveillance object. The visual surveillance system can search the database DB for a surveillance object corresponding to the text (S210). The visual surveillance system can display a retrieved surveillance object (S220). The visual surveillance system can match the first text with a position of the displayed surveillance object and display the matched text (S230). In an alternative embodiment, instead of the text, information including a text or a symbol or number or an indication image that are stored in the database DB in response to the surveillance object may be displayed (S230). Here, at least one of the position, size, and shape of the displayed surveillance object can be changed (S240). The visual surveillance system can set a surveillance event for a position where the surveillance object is displayed (S250).

Implementations of the method of displaying a surveillance object and setting the surveillance event in the surveillance object are described in more detail below.

<Text Input and Search for Text>

The visual surveillance system can provide a user with the input unit 16 enabling the user to input text. In the case where the input unit 16 uses a handwriting input method such as a touch screen method or a touch pad method, a user can input text to the display unit 16 that displays surveillance images in such a way as to directly write the text. In the case where handwriting is directly inputted to the display unit 16 as described above, the visual surveillance system can use a handwriting recognition algorithm capable of recognizing handwriting as text. In the implementation, the visual surveillance system may include a graphical user interface (GUI). In such an implementation, surveillance images and a text input window are displayed on the display unit 18 at the same time.

Text inputted by a user in order to display a surveillance object is hereinafter referred to as a first text.

Figure 4A:
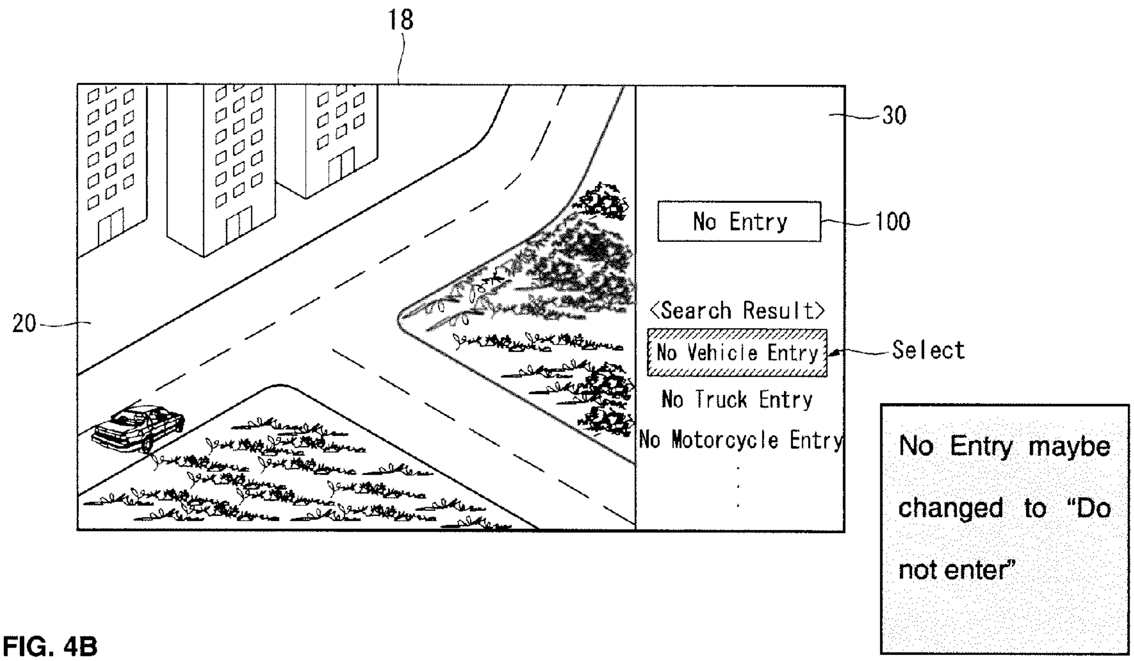
FIGS. 4A to 5C are exemplary screens illustrating the method of setting a surveillance object.

Referring to FIG. 4A, a screen of the display unit 18 is classified into a surveillance image display region 20 and an input region 30 for inputting text. For example, when a user inputs the first text called "Do Not Enter" to an input window 100 of the input region 30, the visual surveillance system can search the database DB for text corresponding to "Do Not Enter".

If, as a result of the search, text correctly corresponding to the first text is not retrieved from the database DB, the visual surveillance system can display a plurality of retrieval results similar to the text to the user. If a plurality of texts is retrieved from the database DB based on the first text, the visual surveillance system can display all the retrieved results to the user, and the user can select a desired one from the retrieved results.

For example, in the case where "No Vehicle Entry", "No Truck Entry", and "No Motorcycle Entry" are stored in the database DB, the visual surveillance system can output "No Vehicle Entry", "No Truck Entry", and "No Motorcycle Entry" as retrieval results for the text "Do Not Enter". The user can select one of the retrieval results.

Meanwhile, in the case where a keyword previously set in the visual surveillance system is comprised in the first text, the visual surveillance system can display retrieval results corresponding to the keyword.

For example, in the case where the user inputs "Do Not Enter XX" as the first text, if "Do Not Enter XX" is not stored in the database DB, the visual surveillance system can recognize "Enter" or "Do Not Enter" of the first text "Do Not Enter XX" as a keyword and search the database DB for all texts including the keyword. The visual surveillance system can receive one of the retrieved texts from the user.

Figure 5A:
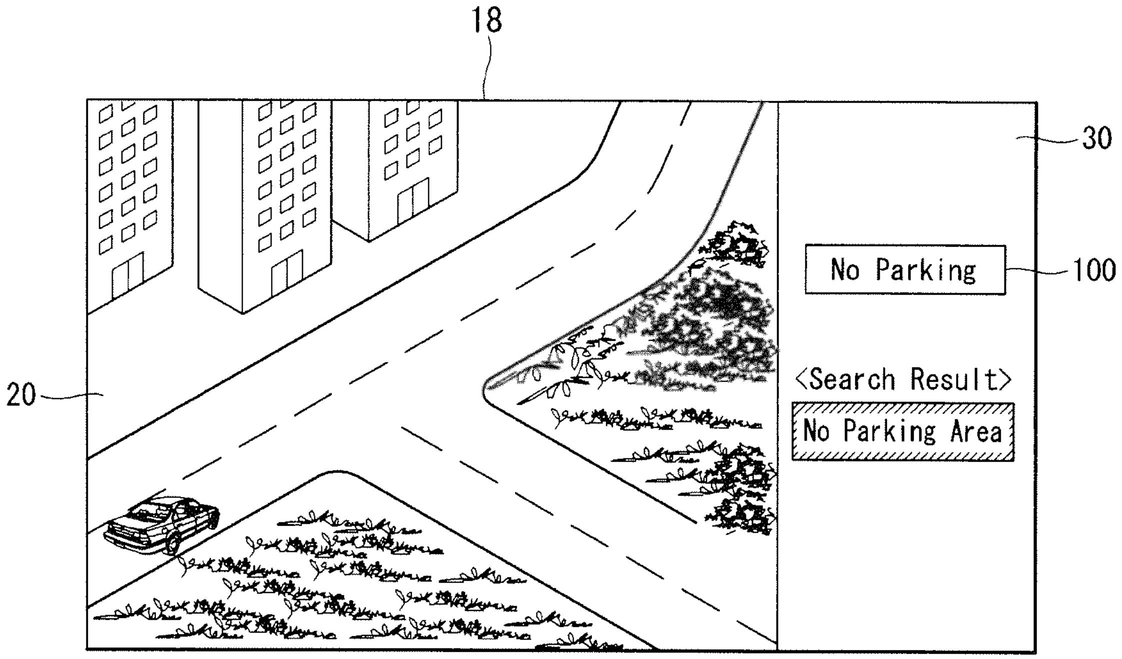
Figure 5B:
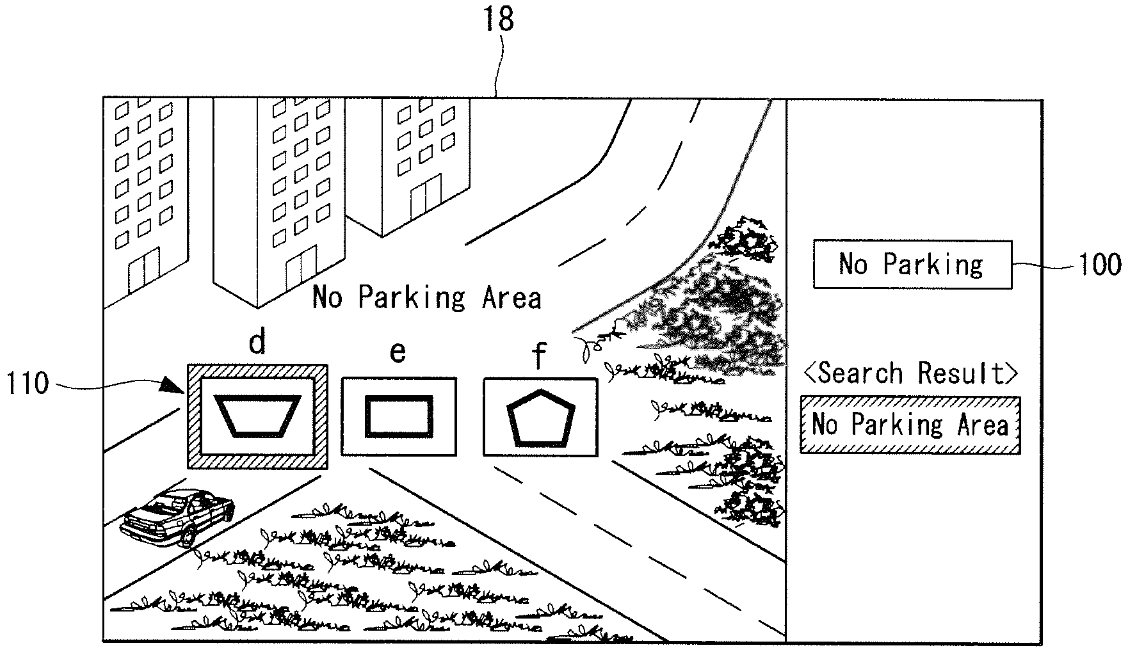
Figure 5C:
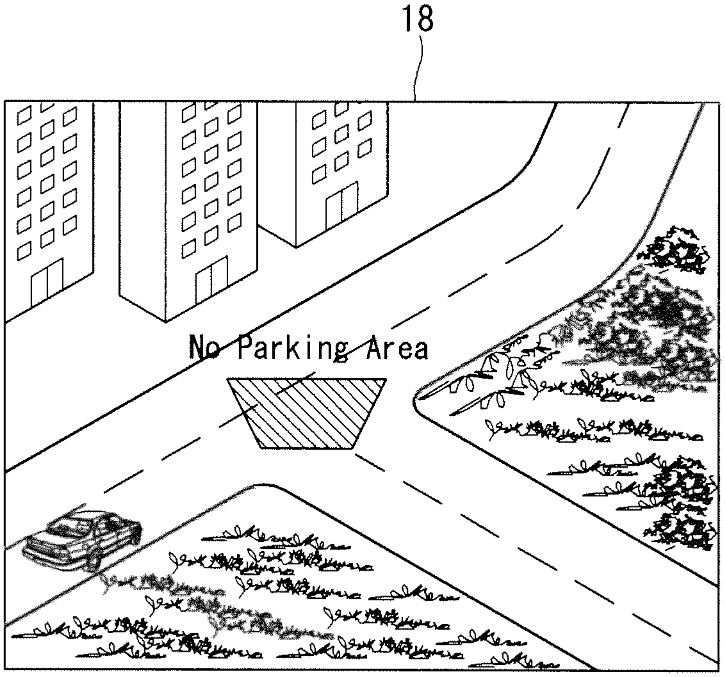

FIG. 5A shows an example in which a user has inputted the first text "No Parking" to the input window 100 and also shows that "No Parking Area" has been retrieved based on the first text "No Parking". FIG. 5B shows that there are surveillance objects, including a trapezoid, a rectangle, and a pentagon, and also shows that the surveillance object 'trapezoid' selected by a user is displayed. FIG. 5C shows that, instead of the first text "No Parking" inputted by the user, a text "No Parking Area" matched with the surveillance object trapezoid is displayed along with the surveillance object.

<Display of Surveillance Object>

When a text corresponding to the first text is selected from among texts stored in the database DB, the visual surveillance system can display a surveillance object corresponding to the selected text along with a surveillance image such that the surveillance object overlaps with the surveillance image, as described above with reference to FIGS. 4A to 5C. The surveillance object may be translucent.

In the database DB, the texts and the surveillance objects can have a one-to-one correspondence relationship or a one-to-many correspondence relationship. For example, the types of surveillance objects corresponding to the selected text may be plural. In this case, the visual surveillance system can display all the surveillance objects and provides a user with the user interface that enables the user to select a desired surveillance object. The surveillance object selected by the user can be displayed together with the surveillance image.

Figure 4B:
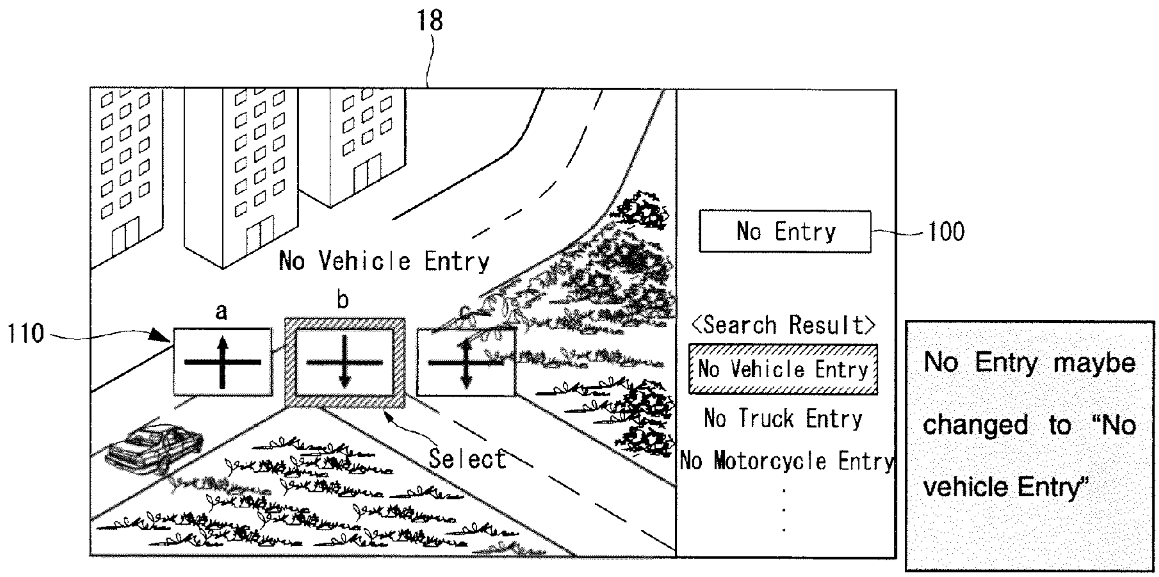

For example, referring to FIG. 4B, when a text inputted by a user is "No Vehicle Entry", surveillance objects 110 corresponding to the text may include "a, b, and c". Here, all the three surveillance objects 110 are displayed. The surveillance object 'a' may be an object for setting the entry of a target object from a downward direction to an upward direction on the basis of a line as a surveillance event. The surveillance object 'b' may be an object for setting the entry of a target object from an upward direction to a downward direction on the basis of a line as a surveillance event. Further, the surveillance object 'c' may be an object for setting the prohibition of entry in both directions as a surveillance event. Here, the user can select a desired one from the three surveillance objects "a, b, and c". FIG. 4B shows that the surveillance object 'b' has been selected. The visual surveillance system can display the selected surveillance object 'b'. Meanwhile, the database DB can match general surveillance events with respective surveillance objects and store them. The surveillance events stored in the database DB may be surveillance events that are frequently used by a user.

After displaying the selected surveillance object 'b', the visual surveillance system can display the first text inputted by the user such that it correspond to a position of the surveillance object 'b'.

Figure 4C:
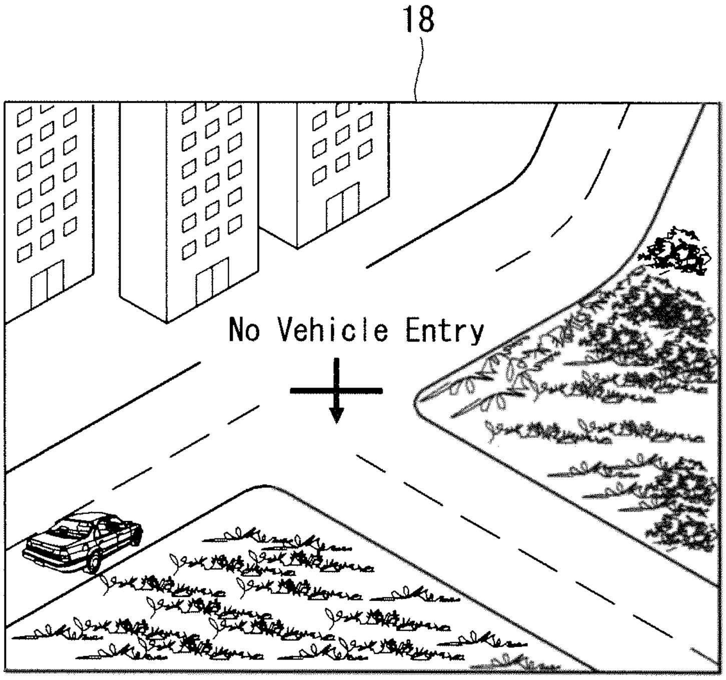

For example, FIG. 4C shows that the visual surveillance system displays the surveillance object 'b' together with "No Vehicle Entry" (i.e., text corresponding to the surveillance object 'b') in the display unit 18. In another embodiment, the visual surveillance system may receive a second text that will be displayed in response to the surveillance object 'b' from a user and display the second text such that it corresponds to the surveillance object 'b'.

Furthermore, FIG. 5C shows that the visual surveillance system displays the first text such that it corresponds to a position of a surveillance object 'd'.

By displaying any one of the first text corresponding to the surveillance object and the first and second texts corresponding to the surveillance object, the user can easily notice a surveillance event set in the surveillance object.

Further, the surveillance unit 10 can store the text corresponding to the displayed surveillance object 'b', together with the surveillance object, in the database DB of the memory 14.

A surveillance object may comprise a typical symbol indicative of the attribute of a surveillance event. In the case where the surveillance object comprises a symbol, the first text or the second text corresponding to the surveillance object may not be displayed. The symbol may be a symbol that easily indicates the object of a surveillance event that can be set in the surveillance object.

Figure 6A:
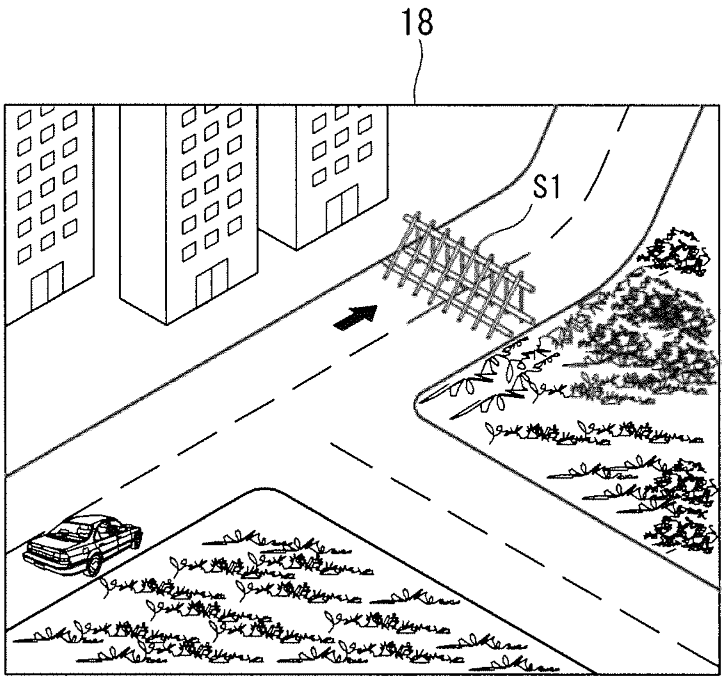
FIGS. 6A and 6B are diagrams illustrating a surveillance object.
Figure 6B:
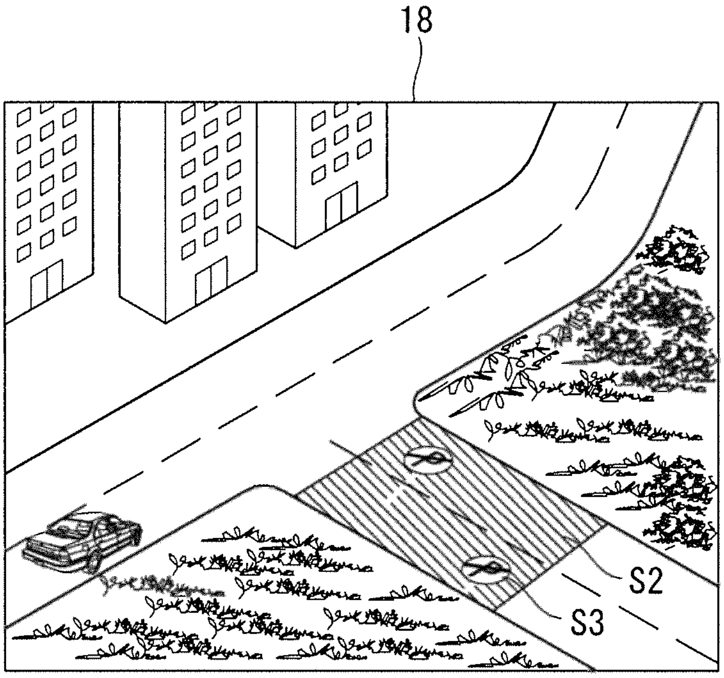

FIG. 6A shows that a surveillance object S1 corresponding to "No Vehicle Entry" is displayed, and FIG. 6B shows that a surveillance object S2 corresponding to "No Parking Area" is displayed together with a surveillance image.

The surveillance object S1 shown in FIG. 6A is a symbol, including a barricade and an arrow indicative of the direction of entry. When the surveillance object S1 is displayed together with a surveillance image, a user can easily notice a surveillance event set in the surveillance object.

The surveillance object S2 shown in FIG. 6B includes a symbol S3 indicative of "No Parking". Thus, a user can easily notice a surveillance event set in the surveillance object S2.

Since the surveillance objects S1 and S2 comprise symbols coinciding with the purposes of respective surveillance events as described above, a user can easily notice the surveillance events set in the surveillance objects S1 and S2 although texts corresponding to the respective surveillance objects S1 and S2 are not displayed.

<Change of Position, Size, and Shape of Surveillance Object>

Figure 7A:
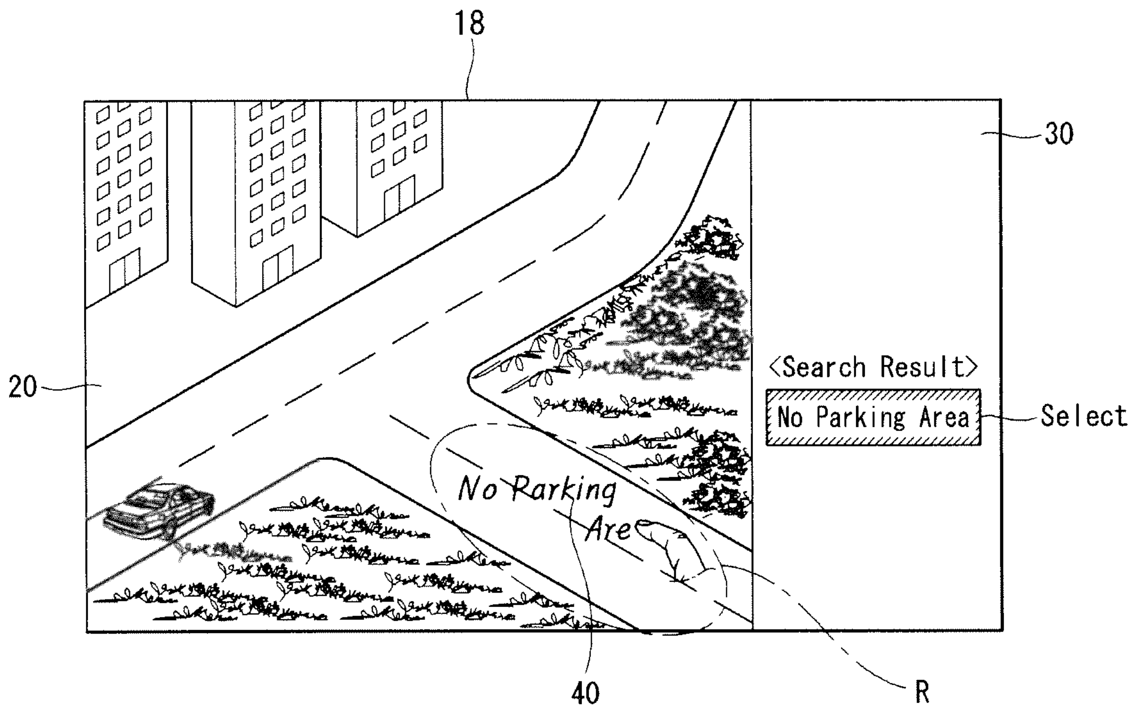
FIGS. 7A to 10C are diagrams illustrating a method of setting a surveillance object.
Figure 7B:
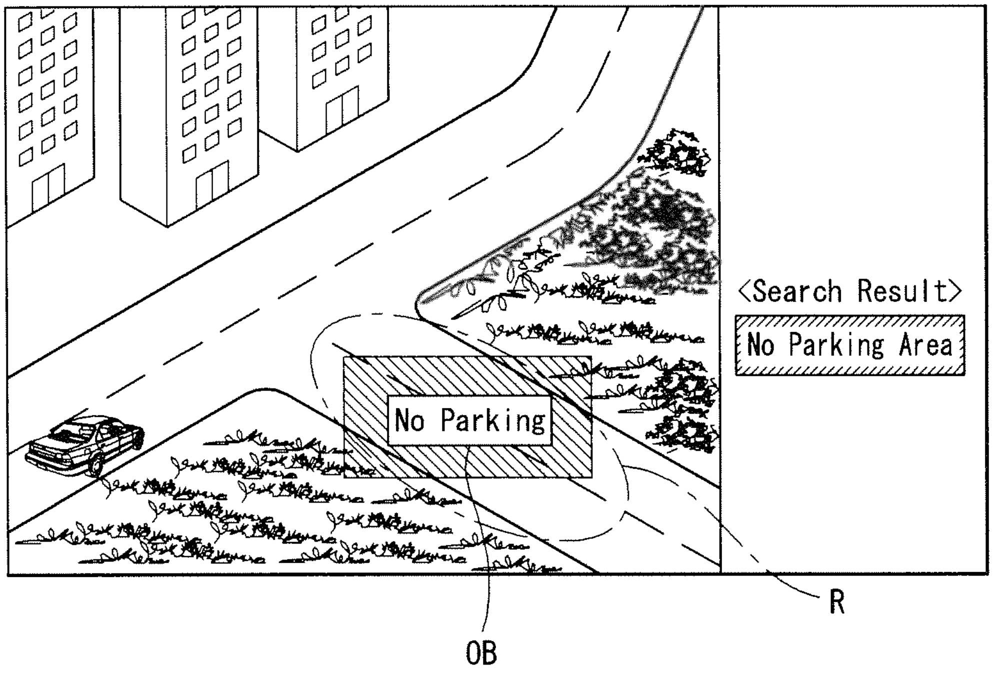

Referring to FIGS. 7A and 7B, when the input unit 16 is a touch screen or a touch pad, a user can directly input the first text to the surveillance image display region 20 in which a surveillance image is being displayed. Here, the user can input the first text near a position at which a surveillance object will be set. For example, as shown in FIG. 7A, the user may write the first text 40 near a no-parking area R to be set. When the first text 40 is inputted, the surveillance unit 10 recognizes the first text 40, searches the database DB for a text corresponding to the first text 40, and displays the retrieved text in the input region 30. The displayed text is selected by the user. Such an operation is identical to that described with reference to FIG. 4A, and a description thereof is omitted for simplicity. When the text is selected, the visual surveillance system can display a surveillance object OB corresponding to the first text at the position where the first text has been inputted.

Meanwhile, when the input unit 16 is a key input device, the surveillance object corresponding to the first text can be displayed at the center of a screen of the display unit 18, as shown in FIGS. 4B and 5B. Further, the position of the surveillance object may be randomly determined. In this case, the surveillance object may not be placed at a position where a surveillance event will be set by a user.

Accordingly, the visual surveillance system can provide the user with the user interface, enabling the user to change at least one of the position, size, and shape of the surveillance object. The user can accurately position the surveillance object at a desired region using the user interface.

An implementation in which at least one of the position, size, and shape of the surveillance object is changed is described below with reference to FIGS. 8A to 8D.

Figure 8A:
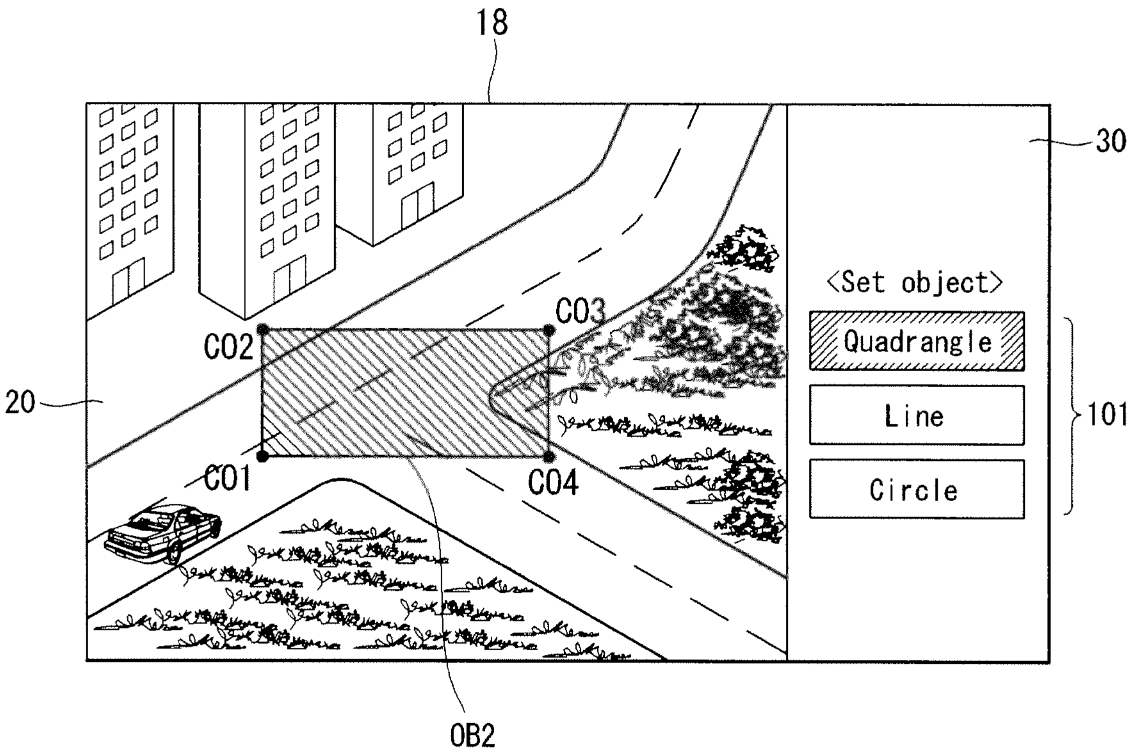

FIG. 8A shows that an object setting menu is displayed in the input region 30, an object shape menu 101 including a quadrangle, a line, and a circle is displayed, and the surveillance unit 10 displays a selected surveillance object OB2 having a quadrangle at the center of a screen of the surveillance image display region 20. The surveillance object OB2 has four vertexes CO1, CO2, CO3, and CO4.

Figure 8B:
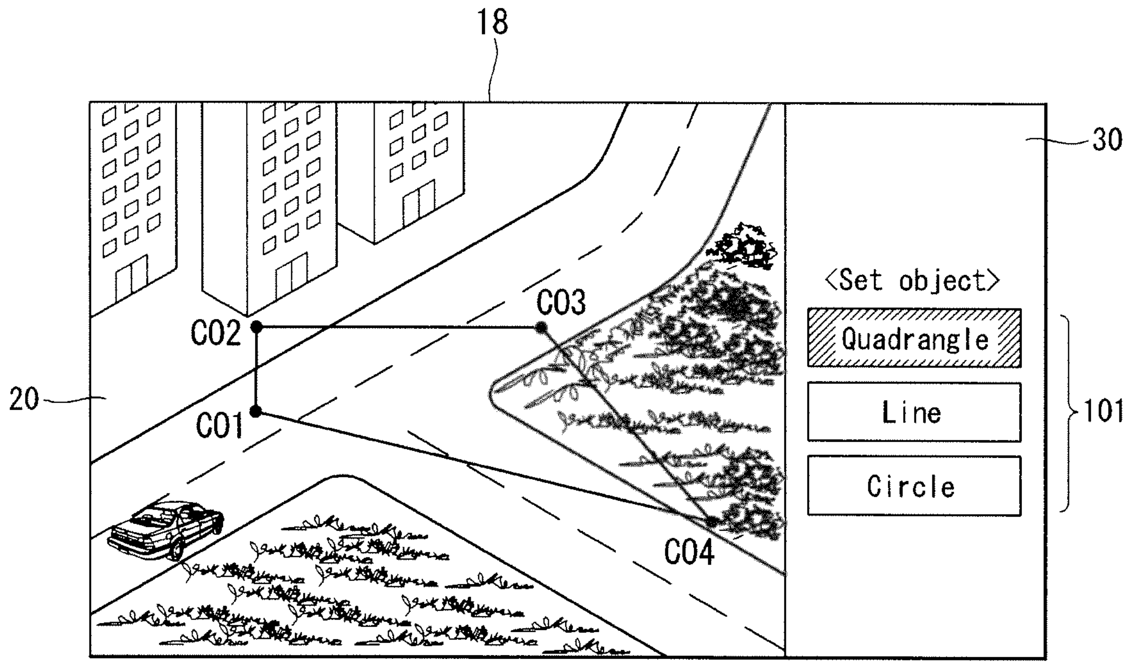
Figure 8C:
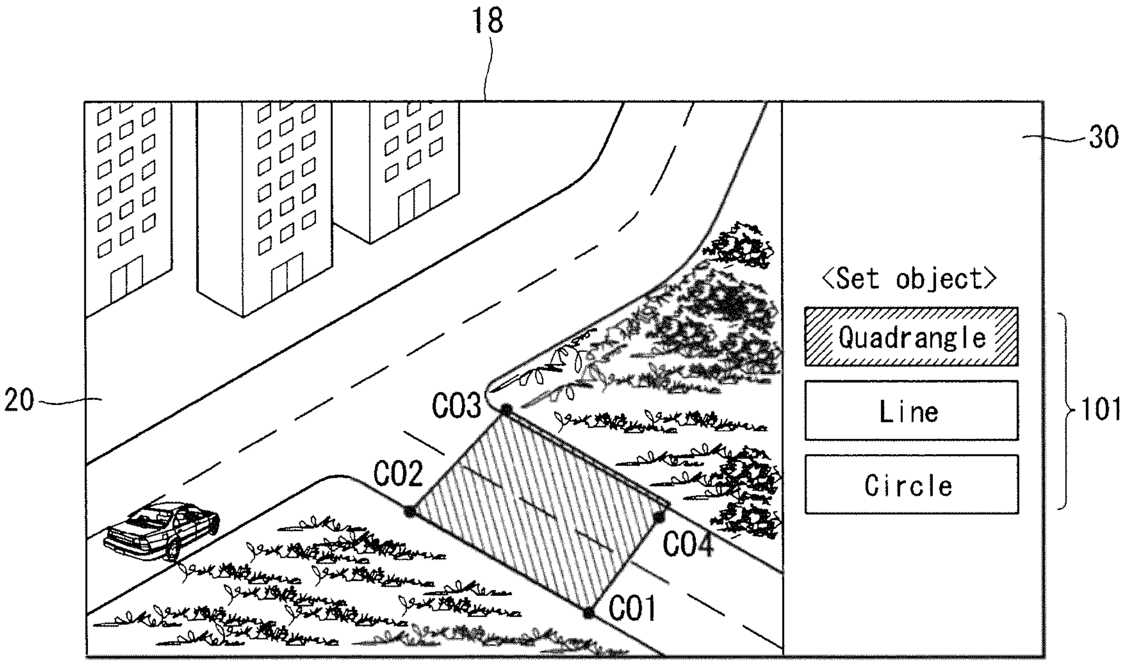

A user can move the position of each of the vertexes CO1, CO2, CO3, and CO4 of the surveillance object OB2 to a desired position using the user interface. FIG. 8B shows that the position of the vertex CO4 of the vertexes CO1, CO2, CO3, and CO4 has moved. The visual surveillance system can provide the user interface using a drag & drop method such that the position of the vertex CO4 can be moved. In a similar way, the positions of the remaining three vertexes CO1, CO2, and CO3 can be moved. Accordingly, as shown in FIG. 8C, the surveillance object OB2 can be displayed to have a size and a shape that are wanted by the user.

Figure 8D:
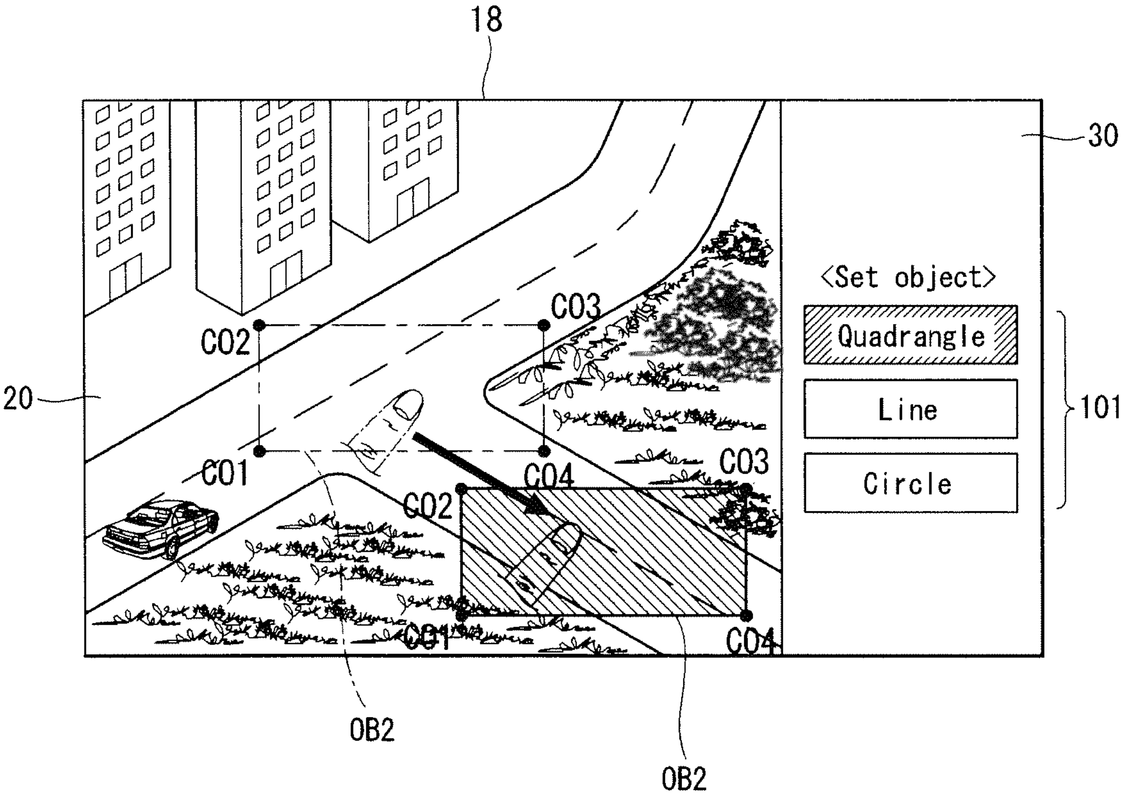

Further, when the display unit 18 is a touch screen, the user can drag and change the position of the surveillance object OB2 as shown in FIG. 8D. The user can change the entire position of the surveillance object OB2 to a desired position and then change the position of each of the vertexes CO1, CO2, CO3, and CO4 to a desired position as described above with reference to FIGS. 8A to 8C.

Even in the implementation described above with reference to FIGS. 7A and 7B, the user can change the position, size, and shape of the surveillance object as described above with reference to FIGS. 8A to 8D.

The surveillance unit 10 may analyze a text inputted by a user, extract an object region corresponding to the text from the surveillance image, and display a surveillance object corresponding to the inputted text in response to the position, size, and shape of the extracted object region. For example, the surveillance unit 10 can extract a specific object included in the surveillance image using an auto-segmentation technology. This method is described in detail below.

Figure 9A:
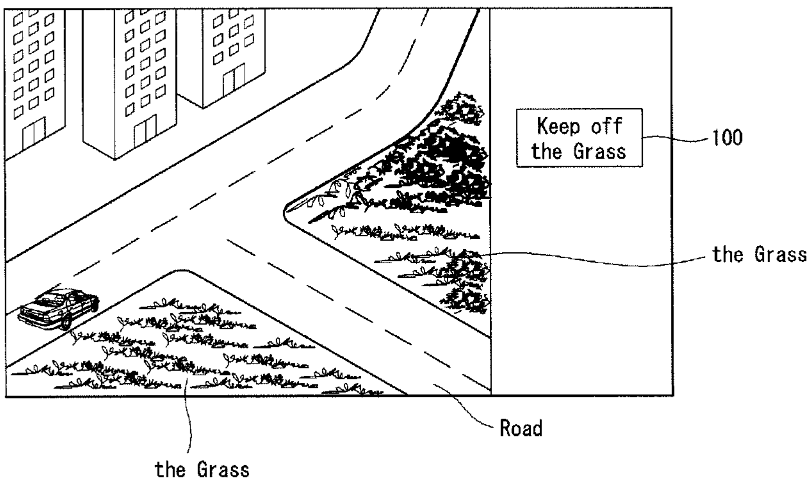
Figure 9B:
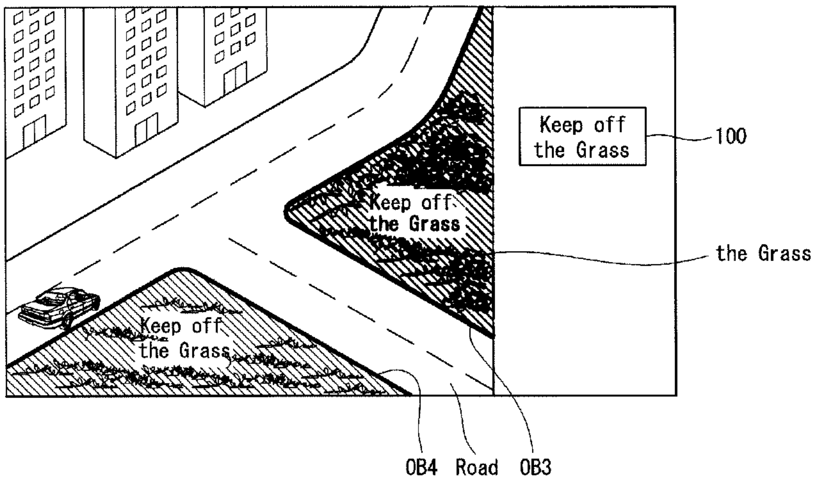

FIGS. 9A and 9B are diagrams illustrating a method of setting a surveillance object using the auto-segmentation technology. As shown in FIG. 9A, a user can input the first text "Keep off the Grass" to the input window 100. In this case, the visual surveillance system can recognize "the Grass" as a keyword. The visual surveillance system may search the database DB for an image pattern that is previously stored in response to the "the Grass". For example, image patterns corresponding to "the Grass" may be previously stored in the memory 14, and the visual surveillance system may extract a region corresponding to "the Grass" from the surveillance image using the image pattern stored in the memory 14.

The image pattern is information that is provided by the visual surveillance system in order to separate a pertinent region from the surveillance image, and it refers to unique attributes for distinguishing the pertinent region, such as color, a color distribution, a contour, and texture.

FIG. 9B shows that "the Grass" region is separated using the auto-segmentation technology and surveillance objects OB3 and OB4 corresponding to the separated region are displayed. "Keep off the Grass" (i.e., the first text) can be displayed in response to the positions of the surveillance objects OB3 and OB4 as described above. Accordingly, the user can set a surveillance object in a desired region by inputting only text and so easily set the surveillance object.

The visual surveillance system may auto-segment an acquired surveillance image every regions which are included in the surveillance image and can be classified. As described above with reference to FIGS. 9A and 9B, the visual surveillance system of the present implementation may be useful when there is no information about image patterns for a first region, a second region, and a third region. In this case, the visual surveillance system can analyze a contour, the degree of a change in color, etc. which are included in a surveillance image and can segment a surveillance region every objects included in the surveillance image.

Figure 10A:
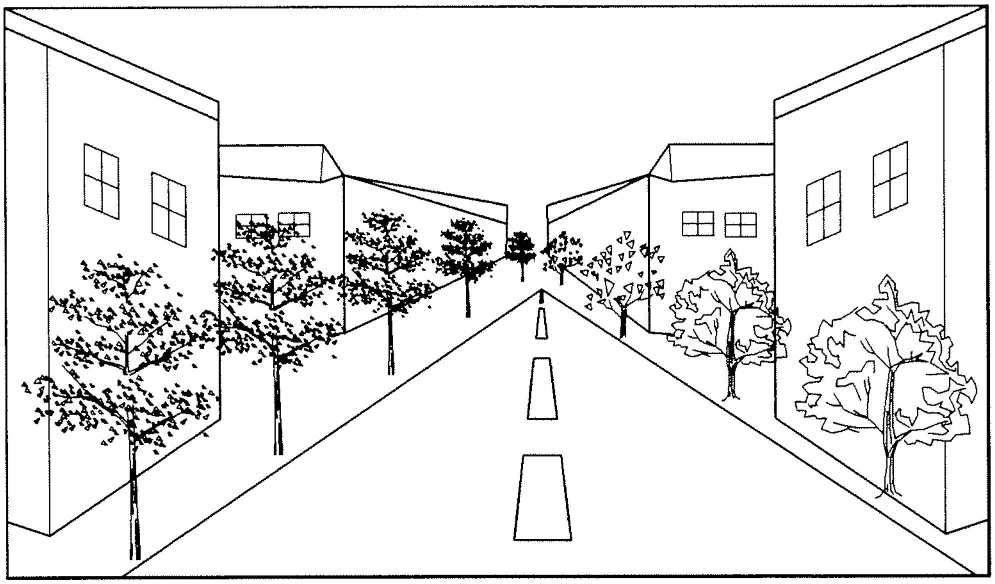
Figure 10B:
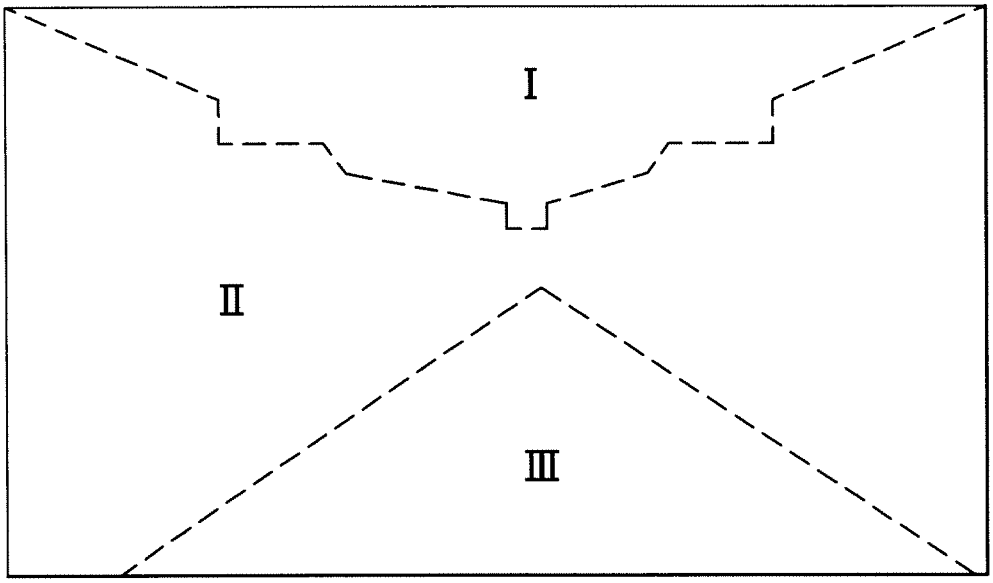
Figure 10C:
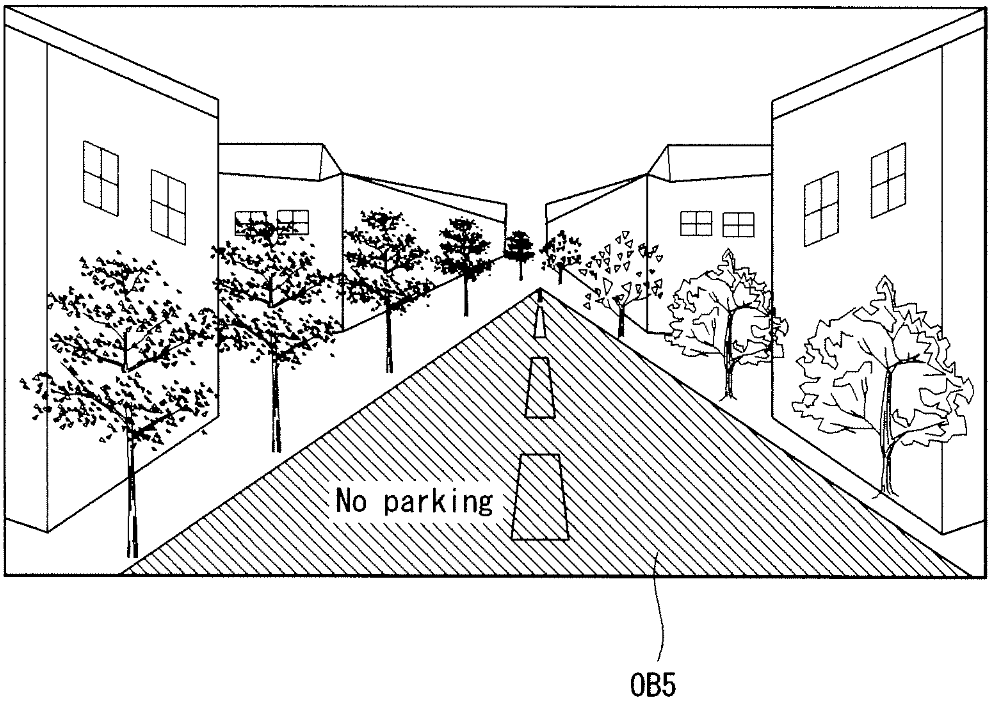

FIGS. 10A to 10C are diagrams illustrating that a surveillance object is set by segmenting a surveillance image on an object basis. FIG. 10A shows a surveillance image that can be segmented into a first region corresponding to the sky, a second region corresponding to buildings, and a third region corresponding to a road. The visual surveillance system can analyze image information of the surveillance image, such as a contour and the degree of a change in color, and automatically segment the surveillance image into the first, second, and third regions. The results of the segmentation are shown in FIG. 10B. The surveillance image can be automatically segmented on a region basis using an abrupt change of a contour, color, etc. of each of objects that are included in the surveillance image rather than using previously stored image pattern information.

The visual surveillance system receives a first text from a user. When the user selects the third region corresponding to the road, the visual surveillance system can display a surveillance object corresponding to the first text according to the position, size, and shape of the third region. For example, referring to FIG. 10C, when the user inputs "No Parking" and selects the third region, a surveillance object can be displayed according to the third region. Further, the visual surveillance system can display the surveillance object together with "No Parking" (i.e., the inputted first text).

As described above, a surveillance object can be easily set in a desired surveillance region with respect to regions whose pattern information has not been previously stored in the visual surveillance system.

<Setting of Surveillance Event>

The user can set a surveillance event at a position where the set surveillance object has been displayed. The visual surveillance system can provide the user interface enabling the user to set the surveillance event. The user can set the surveillance event that will be set for the surveillance object using the user interface.

For example, in the case where the surveillance object indicates a region, the user can set a detailed event, such as an event indicating that a certain target object enters the region, an event indicating that a certain target object goes out of the region, an event indicating that a certain target object moves within the region, and an event indicating that a certain target object does not move within the region. Further, the user can limit the target object to a specific object, such as a person, a vehicle, or a puppy. For example, in the case where the entry of a 'vehicle' to a surveillance region set by the surveillance object is set as a surveillance event, the visual surveillance system may determine that the surveillance event has occurred only when the 'vehicle' enters the surveillance region and that the surveillance event has not occurred when other object (e.g., a person) not the vehicle enters the surveillance region.

Meanwhile, the visual surveillance system can match typical surveillance events that are frequently used by a user with the surveillance objects stored in the database DB. For example, a text such as "No Parking", a surveillance object such as "quadrangle", and a surveillance event such as "that a vehicle does not move for 5 minutes after entering a surveillance region" can be matched and stored in the database DB.

As described above, the visual surveillance system provides the user interface enabling a user to easily set a proper surveillance object such that the user can set a surveillance event and can set a surveillance event to be monitored through the surveillance object.

The visual surveillance system analyzes and determines whether the set surveillance event occurs by analyzing a surveillance image based on the set surveillance object and the set surveillance event. If the surveillance event is determined to have occurred, the visual surveillance system performs a subsequent operation that is previously set. Determining whether the surveillance event has occurred through the visual surveillance system may also be performed by analyzing the motions of objects included in the surveillance image.

According to this document, a user can easily set a surveillance object using the user interface provided by the visual surveillance system. Furthermore, the visual surveillance system displays a text, indicating a use of the surveillance object, at a position corresponding to the surveillance object. Accordingly, after setting a surveillance event, the user can easily determine which surveillance event has previously been set in the surveillance object.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of operating a surveillance system having a display unit configured to display a surveillance image of a surveillance location, the method comprising:

acquiring the surveillance image of the surveillance location;

receiving a first text input by a user;

analyzing the received first text and the acquired surveillance image;

extracting, by at least one processor, a part of the acquired surveillance image corresponding to a part of the surveillance location, wherein the part of the surveillance location corresponds to a meaning of the received first text that is obtained based on a result of analyzing the received first text;

setting the part of the surveillance image as a surveillance region;

displaying a surveillance object corresponding to the received first text such that the surveillance object is overlapped with the surveillance region;

receiving a second text input by the user, the second text input corresponding to the displayed surveillance object;

displaying the surveillance object together with the received second text;

setting a surveillance event that occurs with respect to the surveillance object based on at least one of the meaning of the received first text or a meaning of the second text that is obtained based on a result of analyzing the received second text;

analyzing, by at least one processor, the surveillance region corresponding to the surveillance object and determining whether the set surveillance event has occurred based on a result of analyzing the surveillance region; and responsive to a determination that the set surveillance event has occurred, performing an indicating operation in the surveillance system.

2. The method of claim 1, wherein extracting the part of the acquired surveillance image corresponding to a part of the surveillance location that corresponds to a meaning of the received first text includes extracting the part of the acquired surveillance image using an auto-segmentation based on the meaning of the received first text.

3. The method of claim 1, wherein extracting the part of the acquired surveillance image corresponding to a part of the surveillance location that corresponds to a meaning of the received first text includes:

separating the surveillance image into a plurality of regions by considering a change of a contour and color of the surveillance image based on a result of analyzing the acquired surveillance image; and selecting a region corresponding to the meaning of the received first text from the plurality of regions included in the acquired surveillance image.

4. The method of claim 1, further comprising storing the surveillance image based on the set surveillance event having occurred.

5. The method of claim 1, wherein performing the indicating operation comprises displaying an indication image or text in response to the occurrence of the set surveillance event on the displaying unit.

6. The method of claim 1, wherein performing the indicating operation comprises generating an alarm or producing a voice stored in a storage unit in response to the occurrence of the set surveillance event.

7. The method of claim 1, wherein performing the indicating operation comprises sending a text message to a registered telephone number in response to the occurrence of the set surveillance event.

8. The method of claim 1, wherein the second text is received from the user in response to displaying the surveillance object.

9. A method of operating a surveillance system having a display unit configured to display a surveillance image of a surveillance location received from image acquisition devices, the method comprising:

acquiring and displaying the surveillance image of a surveillance location;

receiving a first text input by a user;

analyzing the received first text and obtaining a meaning of the received first text;

searching, by at least one processor, a plurality of surveillance objects corresponding to the meaning of the received first text from among a plurality of image objects stored in a storage unit;

displaying the plurality of surveillance objects in a selectable list and selecting a surveillance object from among the plurality of surveillance objects in response to a selection by a user;

displaying the selected surveillance object with the surveillance image such that the selected surveillance object is overlapped with a part of the surveillance image corresponding to a part of the surveillance location;

setting the part of the surveillance image as a surveillance region;

receiving a second text input by the user, the second text input corresponding to the selected surveillance object;

displaying the selected surveillance object together with the received second text;

setting a surveillance event that occurs with respect to the selected surveillance object based on at least one of the obtained meaning of the received first text or a meaning of the second text that is obtained based on a result of analyzing the received second text;

analyzing, by at least one processor, the surveillance and determining whether the set surveillance event has occurred based on a result of analyzing the surveillance region; and responsive to a determination that the set surveillance event has occurred, performing an indicating operation in the surveillance system.

10. The method of claim 9, wherein receiving the first text comprises:

inputting text from a user;

detecting related texts similar to the inputted text from among a plurality of texts stored in the storage unit;

displaying the related texts on the display unit; and enabling selection of the related texts.

11. The method of claim 9, wherein the searching the image object comprises:

accessing a pre-stored image pattern stored in the storage unit corresponding to the meaning to the received first text; and detecting an image object corresponding to the image pattern from among the plurality of image objects based on the retrieved image pattern.

12. The method of claim 9, wherein a shape of the surveillance object comprises at least one of a line or a closed curve comprising a polygon.

13. The method of claim 9, wherein a predetermined surveillance event matches with the surveillance object.

14. The method of claim 13, wherein the surveillance object reflects an attribute of the surveillance event.

15. A surveillance system, comprising:

an input unit configured to receive a first text input by a user;

a storage unit configured to store a plurality of image objects; and a controller configured to perform operations comprising:

analyzing the received first text and obtaining a meaning of the received first text;

searching a plurality of surveillance objects corresponding to the meaning of the received first text from among the plurality of image objects stored in the storage unit;

displaying the plurality of surveillance objects in a selectable list and selecting a surveillance object from among the plurality of surveillance objects in response to a selection by a user;

displaying the selected surveillance object with a surveillance image of a surveillance location such that the selected surveillance object is overlapped with a part of the surveillance image corresponding to a part of the surveillance location;

setting the part of the surveillance image as a surveillance region;

receiving a second text input by the user, the second text input corresponding to the selected surveillance object;

displaying the selected surveillance object together with the received second text;

setting a surveillance event that occurs with respect to the selected surveillance object based on at least one of the obtained meaning of the received first text or a meaning of the second text that is obtained based on a result of analyzing the received second text;

analyzing the surveillance region and determining whether the set surveillance event has occurred based on a result of the analyzing the surveillance region; and responsive to a determination that the set surveillance event has occurred, performing an indicating operation in the surveillance system.

16. The surveillance system of claim 15, wherein the input unit is a touch screen or a touch pad.

17. The surveillance system of claim 15, wherein the surveillance object is indicative of the attribute of the surveillance event.

18. The surveillance system of claim 15, wherein at least one of a position, a size, or a shape of the displayed surveillance object is set or changed by the user.

19. The surveillance system of claim 15, wherein outputs of a display unit are classified into a surveillance image display region and an input region for inputting text based on the text being input.

20. The surveillance system of claim 15, wherein the input information comprises selecting one of the texts stored in the storage unit.

* * * * *